United States Patent
Jung et al.

(10) Patent No.: US 12,034,603 B2
(45) Date of Patent: Jul. 9, 2024

(54) POOLING OF BASEBAND UNITS IN FIFTH GENERATION NETWORKS AND BEYOND

(71) Applicant: AT&T Intellectual Property I, L.P., Atlanta, GA (US)

(72) Inventors: Gueyoung Jung, Belle Mead, NJ (US); Aleksandr Zelezniak, Morganville, NJ (US); Kaustubh Joshi, Short Hills, NJ (US); Shankaranarayanan Puzhavakath Narayanan, Cherry Hill, NJ (US)

(73) Assignee: AT&T Intellect al P Property I, L.P., Atlanta, GA (US)

( * ) Notice: Subject to any disclaimer, the term of this patent is extended or adjusted under 35 U.S.C. 154(b) by 314 days.

(21) Appl. No.: 17/653,545

(22) Filed: Mar. 4, 2022

(65) Prior Publication Data

US 2023/0283524 A1    Sep. 7, 2023

(51) Int. Cl.
*H04L 41/12*    (2022.01)
*H04L 41/5019*    (2022.01)
*H04W 24/02*    (2009.01)

(52) U.S. Cl.
CPC .......... *H04L 41/12* (2013.01); *H04L 41/5019* (2013.01); *H04W 24/02* (2013.01)

(58) Field of Classification Search
CPC ..... G06F 9/45558; G06F 9/4856; H04B 1/74; H04L 41/0654; H04L 41/0823;
(Continued)

(56) References Cited

U.S. PATENT DOCUMENTS 10,159,012 B2 *  12/2018  Haberland ............ H04W 28/16
11,095,559 B1     8/2021  Garvia et al.
(Continued)

FOREIGN PATENT DOCUMENTS

CN    108200665 A  *  6/2018  ............ H04W 28/08
EP    3618518          3/2020
(Continued)

OTHER PUBLICATIONS

Cheng et al., "A Remote Radio Head and Baseband Processing Unit of Resource Scheduling Optimization Method," English machine translation of CN 108200665 A, Clarivate Analytics, p. 1-10 (Year: 2024).*

(Continued)

*Primary Examiner* — Thomas R Cairns

(57) ABSTRACT

Described is pooling baseband units into a hub and mapping radio units associated with the hub to baseband units of the group based on respective resource capacity data of the respective baseband units and an estimated resource usage data of a device that couples to a baseband unit. In one alternative, estimated peak resource usage data of a radio unit over an operation interval is used to select a baseband unit, generally based on which baseband unit of the pool has the least remaining resource capacity, to which the radio unit is mapped for the operation interval. In another alterative, estimated peak resource usage data resource (usage and duration) of a user equipment session is used to dynamically map the user equipment session to a baseband unit, generally selected by which baseband unit of the pool has the least remaining resource capacity.

20 Claims, 12 Drawing Sheets

(58) Field of Classification Search
CPC ............ H04L 41/0893; H04L 41/0894; H04L 41/0896; H04L 41/0897; H04L 41/12; H04L 41/122; H04L 41/34; H04L 41/342; H04L 41/344; H04L 41/40; H04L 41/5019; H04L 43/0876; H04L 47/10; H04L 47/76; H04W 24/02; H04W 24/04; H04W 28/18–26; H04W 88/085; H04W 88/18; H04Q 3/0066; Y02D 30/70
See application file for complete search history.

(56) References Cited

U.S. PATENT DOCUMENTS

| | | | |
|---|---|---|---|
| 11,304,109 | B1 | 4/2022 | Potharaju et al. |
| 2017/0311183 | A1* | 10/2017 | Cotanis .................. H04L 47/11 |
| 2018/0063847 | A1* | 3/2018 | Huang .................. H04W 28/16 |
| 2018/0270869 | A1 | 9/2018 | Tsai |
| 2020/0107307 | A1 | 4/2020 | Nammi et al. |
| 2020/0145154 | A1 | 5/2020 | Black et al. |
| 2020/0196220 | A1 | 6/2020 | Centonza et al. |
| 2020/0274656 | A1 | 8/2020 | Gordaychik |
| 2020/0351955 | A1 | 11/2020 | Jeon et al. |
| 2022/0159510 | A1 | 5/2022 | Jang et al. |
| 2022/0167418 | A1 | 5/2022 | Zelezniak et al. |

FOREIGN PATENT DOCUMENTS

| | | |
|---|---|---|
| EP | 3879886 A1 | 9/2021 |
| WO | 2020096860 | 5/2020 |
| WO | 2020144637 | 7/2020 |
| WO | 2021135416 | 7/2021 |
| WO | 2022087603 | 4/2022 |

OTHER PUBLICATIONS

Notice of Allowance received for U.S. Appl. No. 17/104,458 dated Aug. 10, 2022, 39 pages.
Notice of Allowance received for U.S. Appl. No. 17/104,458 dated Sep. 1, 2022, 17 pages.
Notice of Allowance received for U.S. Appl. No. 17/104,458 dated Nov. 23, 2022, 16 pages.
Notice of Allowance received for U.S. Appl. No. 17/098,619 dated Oct. 18, 2022.
Non-Final Office Action for U.S. Appl. No. 17/104,458 dated Mar. 21, 2022.
Zelezniak, et al., "Sharing of Baseband Units in Fifth Generation Networks and Beyond," U.S. Appl. No. 17/681,511, filed Feb. 25, 2022.
Zelezniak, et al., "Baseband Unit Pooling Using Shared Scheduler," U.S. Appl. No. 17/809,363, filed Jun. 28, 2022.

* cited by examiner

POOLING OF BASEBAND UNITS IN FIFTH GENERATION NETWORKS AND BEYOND

TECHNICAL FIELD

The subject application relates to wireless communications systems in general, and more particularly to New Radio (NR) including fifth generation (5G) cellular wireless communications systems and/or other next generation networks.

BACKGROUND

In fifth generation (5G) cellular wireless communications systems, the cost-of-service deployment is significantly increased relative to prior systems in part because 5G uses higher frequencies than the currently widely-deployed wireless technologies such as fourth generation long term evolution (4G-LTE). The signals using these frequencies allow the network service providers to offer faster speeds and reduced data access latency to its customers compared to any previous generation technologies. However, the higher frequency signals travel considerably shorter distances, dissipate much easier, and penetrate obstacles far less than do the signals of the previous generation technologies do.

As a result, to provide the same service coverage, 5G service needs a far-denser deployment than other existing wireless technologies. Offering 5G services thus presents a substantial burden on service providers in terms of capital and operational cost. A significant portion of the deployment cost results from the cost of the baseband units that communicate data between radio access network nodes and the core network. Moreover, once deployed, such baseband units contribute to the overall operational cost, including energy consumption.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
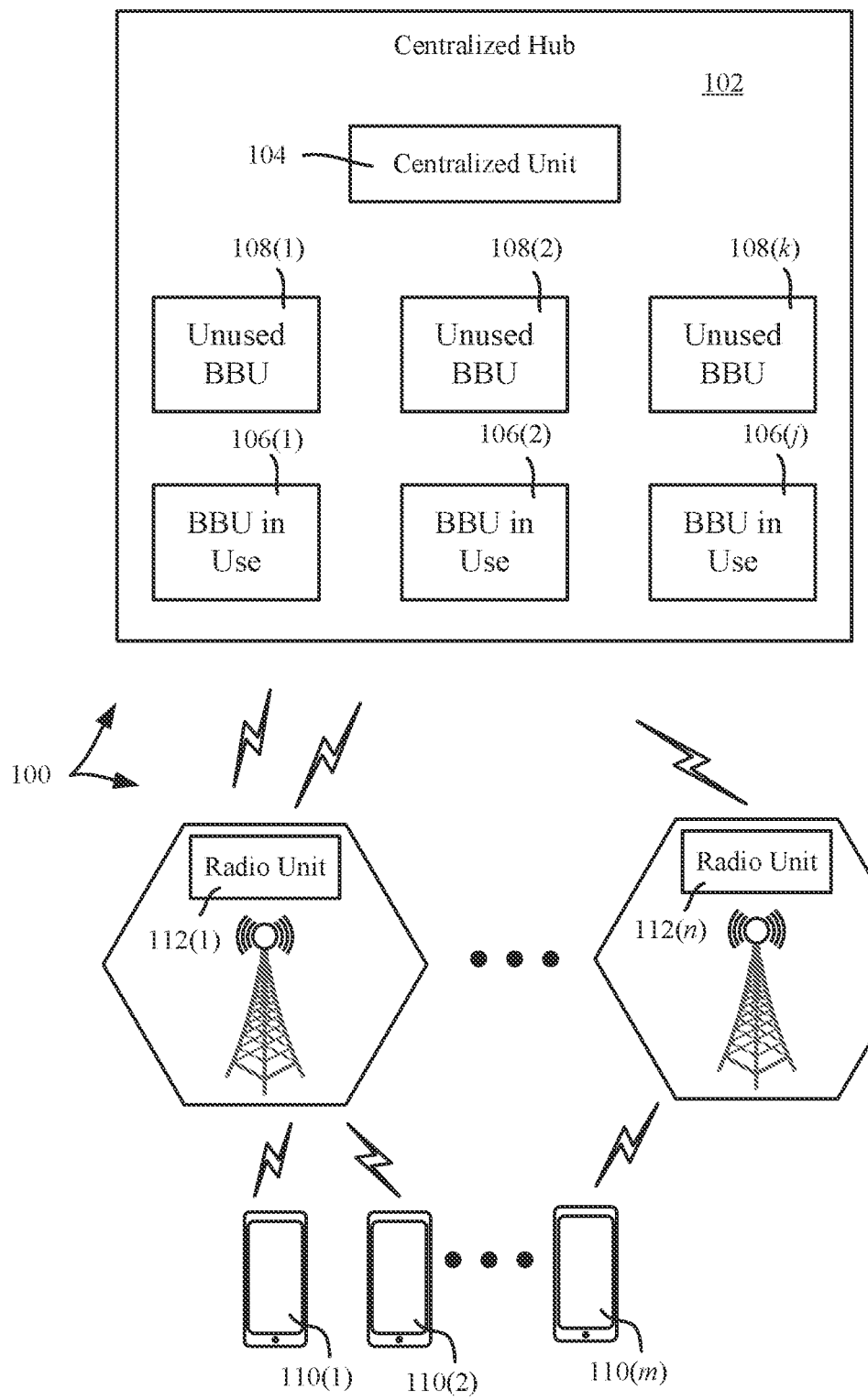
FIG. 1 is a block diagram illustrating an example network communication system in which a hub contains a pool of baseband units, in accordance with various aspects and embodiments of the subject disclosure.

The technology described herein is generally directed towards selectively mapping a baseband unit of a group (pool) of baseband units radio units to a device that couples thereto, e.g., a radio unit, or a user equipment device for a user equipment session. The baseband unit that is selected is generally the baseband unit with the least remaining capacity of those in the pool, so that baseband units that are in use are more fully utilized. Baseband units that are not in use can be entered into a mode that conserves resources including power, such as a sleep mode. Moreover, the baseband unit pooling e.g., into hubs, generally facilitates deployment of fewer baseband units overall.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNodeB (gNB)," "evolved Node B (eNodeB)," "home NodeB (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example communications system 100 of FIG. 1, a hub 102 (e.g., a centralized hub) comprises a centralized unit 104 coupled to a pool of baseband units (BBUs) 106(1)-106(j) and 108(1)-108(k). In the example of FIG. 1, the baseband units 106(1)-106(j) are in use with respect to handling radio communications, and the baseband units 108(1)-108(k) are not in use, e.g., are in a power conservation mode such as powered off, in sleep mode, idle mode, reduced frequency mode, reduced power mode, or the like.

As also represented in FIG. 1, user equipment devices 110(1)-110(m) are communicating with the centralized hub via radio units 112(1)-112(n) (located at cells/antennas). The radio units 112(1)-112(n) are coupled to one of the baseband units 106(1)-106(j) that are in use. Which baseband unit is selectively mapped to which radio unit is described herein with reference to FIGS. 3-6.

Figure 2:
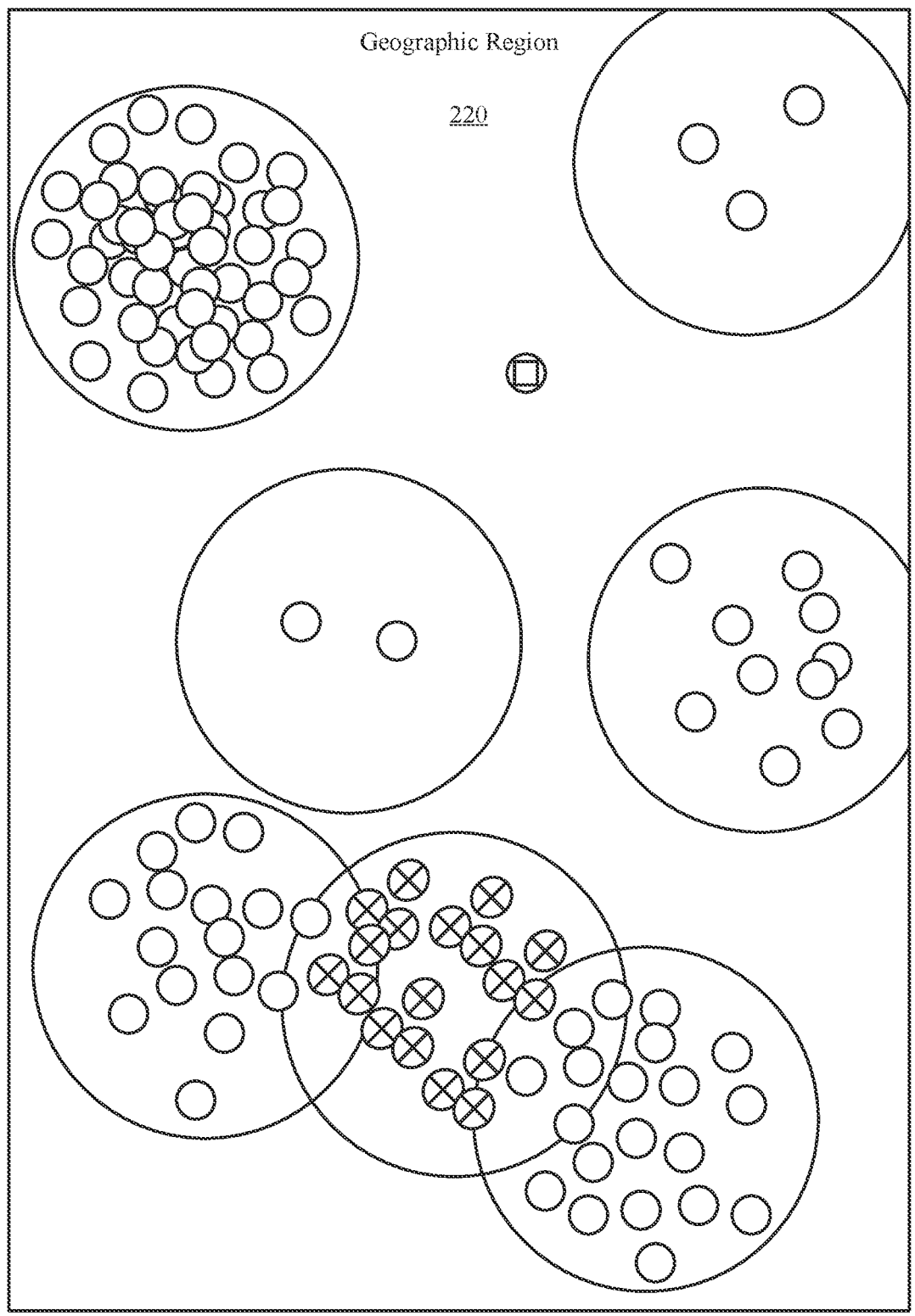
FIG. 2 is an example representation of baseband unit pooling in a geographic region, in accordance with various aspects and embodiments of the subject disclosure.

FIG. 2 shows an example of the concept of pooling in a geographic region 220, in which the large circles represent a pool corresponding to a group of baseband units, with, for example a six mile radius each. Although a six mile radius has been found to be reasonably sufficient, it is understood that this is only an example, and other areas, not necessarily the same size each, can be defined for a pool.

Instead of having baseband units distributed in base stations (e.g., the small circles), the technology described herein pools the distributed baseband units in a certain area into a central hub, e.g., by stacking legacy hardware baseband units or virtualizing baseband unit modules into a cluster of computing servers. A hub, for example, can be located in a single building, located at one (or more) base stations or the like, that contains hardware baseband units and/or a cluster of computing servers with virtualized baseband unit modules. The number of baseband units available in a pool generally corresponds to the need for them, which is generally based on the population density/number of base stations in the defined radius.

Note that in FIG. 2, the small crossed circles are used to illustrate/differentiate to which pool a base station is assigned in a situation in which pools geographically overlap. Further, the small circle with the square inside indicates that a baseband unit/base station need not be part of any pool, such as in a very low population density area, (although alternatively can be considered a "pool" with a single baseband unit).

Figure 3:
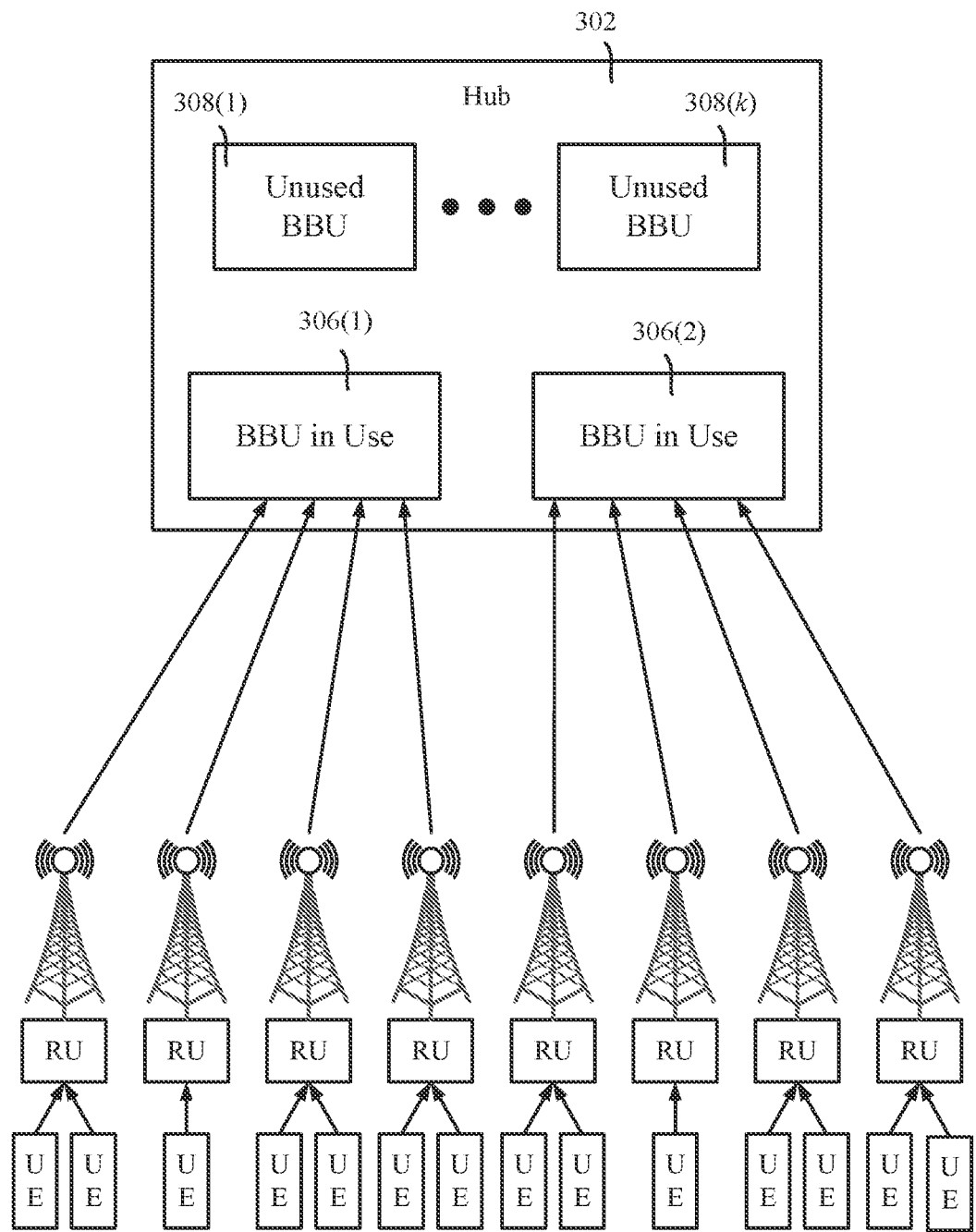
FIG. 3 is a block diagram representing planned (e.g., periodic) remapping between baseband units of a pool and radio units, in accordance with various aspects and embodiments of the subject disclosure.

Turning to selectively mapping baseband units, FIG. 3 shows one alternative implementation (which can be considered a "class1" approach) in which radio units (RUs) are mapped to baseband units (e.g., two baseband units 306(1) and 306(2) in use are depicted in a hub 302), based on the peak resource usage of each radio unit over an operation interval. The operation interval (e.g., 1 hour, 12 hours, or 24 hours) can be selected by the service provider, generally considering the tradeoff between computation issues (stability, time, complexity, possibility of an error and the like) versus baseband unit usage efficiency, which corresponds to resource savings. There can be different intervals for different hubs, such as determined by how volatile the usage variations are per day. Indeed, in the example of FIG. 2, some number of baseband units 308(1)-308(k) are presently unused, and thus can be in sleep mode, for example.

Note that in FIG. 3, the radio units and user equipment (UEs) are not individually labeled for purposes of maintaining clarity in the drawing. Further note that in FIG. 3, four of the eight radio units are shown as being mapped to the baseband unit 306(1) and four to the to the baseband unit 306(2), because, in this example only eight radio units are present and only two baseband units are needed, according to their estimated peak resource usage as described herein. However it is understood that all eight could map to a single baseband unit, or if two baseband units are needed, two radio units could map to one baseband unit and six to the other, three two radio units could map to one baseband unit and five to the other and so on.

Figure 4:
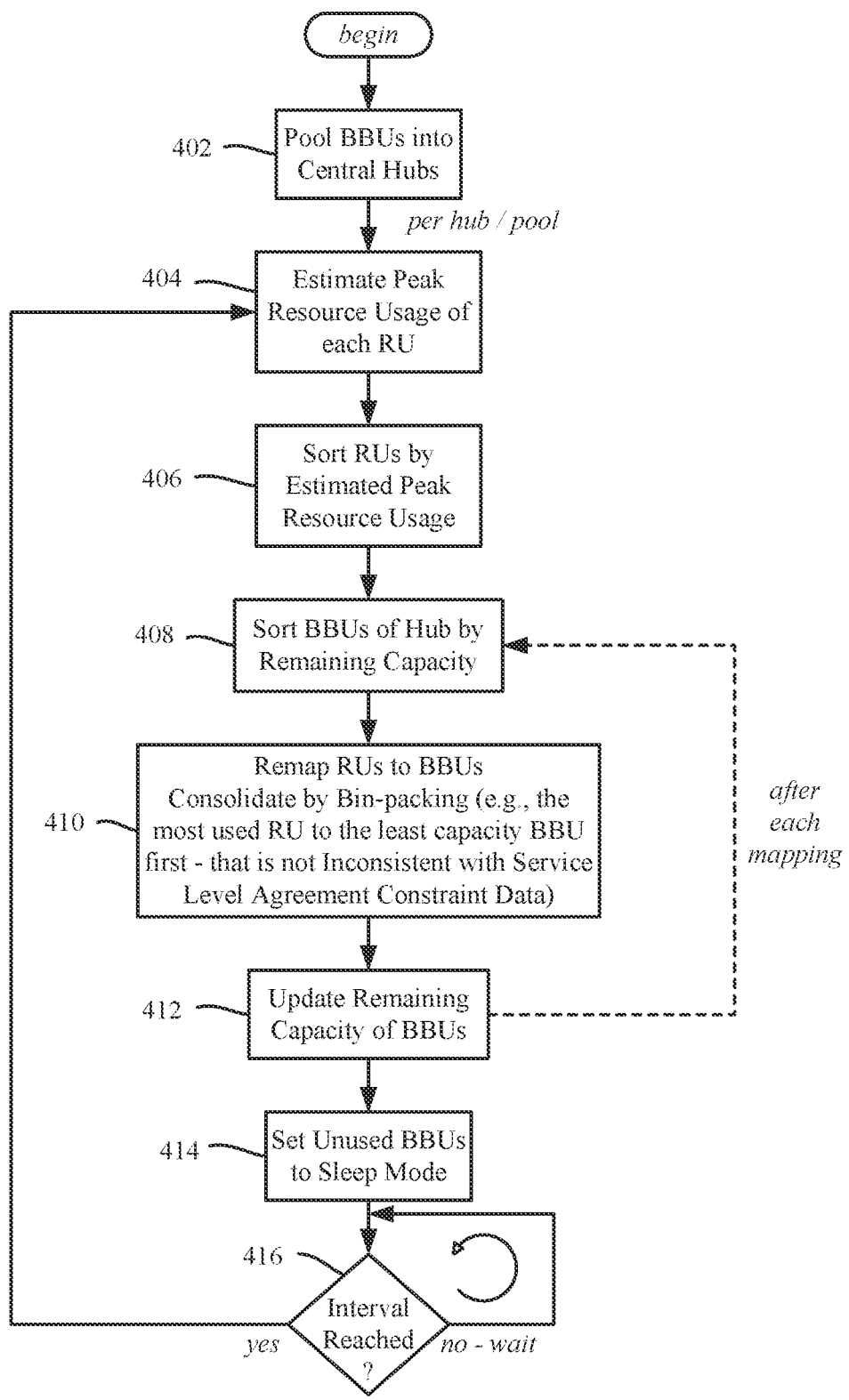
FIG. 4 is a flow diagram illustrating example operations related to remapping radio units and baseband units, in accordance with various aspects and embodiments of the subject disclosure.

The selective mapping (linking) of a baseband unit and each radio unit are described in the example operations of FIG. 4. Operation 402 represents the initial pooling of the baseband units into hubs, with the subsequent operations being per-pool, that is, once the baseband units are pooled into hubs, each hub/pool can perform operations 404 and beyond.

Operation 404 estimates the peak resource usage of each radio unit, which can be collected at any rate over any suitable timeframe that generally corresponds to the chosen operation interval, e.g., per hour for a week, per day for a week or a month and so on. One such peak resource usage metric is packet data convergence protocol (PDCP) throughput (e.g., in megabits per second). In any event, the estimated peak resource usage based on historical data has been found to provide a reasonably accurate prediction over the next operation interval. Operation 406 sorts the radio units based on their peak resource usage, e.g., from the most used to the least used.

Operation 408 sorts the baseband units by their remaining capacity, e.g., from the baseband unit with the least remaining capacity to the baseband unit with the most. For example, the number of physical resources blocks (PRBs) in use relative to the maximum available is one way to determine remaining capacity of a baseband unit. In general, the idea is to use as much capacity as possible per baseband unit, so that one or more baseband units are not used at all and can be put into sleep mode or the like and only awoken if and when needed.

Operation 410 represents the remapping of radio units to baseband units. This consolidates baseband unit usage by bin-packing, namely the most used radio unit is mapped to the least capacity baseband unit first, provided that the least capacity baseband unit, if mapped, is not inconsistent with service level agreement constraint data, e.g., latency constraint data, jitter constraint data, bandwidth constraint data, packet loss constraint data, availability constraint data, throughput constraint data or the like). If service level agreement constraint data would be violated, the next least capacity baseband unit is selected and so on until a suitable baseband unit is determined for the mapping.

Once remapped, operation 412 updates the remaining capacity, e.g., based on the capacity that will be consumed by the estimated resource usage of the radio unit mapped to the baseband unit. Because the remaining capacity thus changes, operation 412 re-sorts the baseband units by their remaining capacities. Operations 410, 412 and 408 are repeated until each radio unit is mapped to a baseband unit in this way.

Once the mapping of the radio units to baseband units is complete, operation 414 sets any unused baseband units to a resource conservation mode, e.g., a sleep mode. Operation 416 represents waiting for the interval to be reached, and once reached restarts the remapping process at operation 404.

Figure 5:
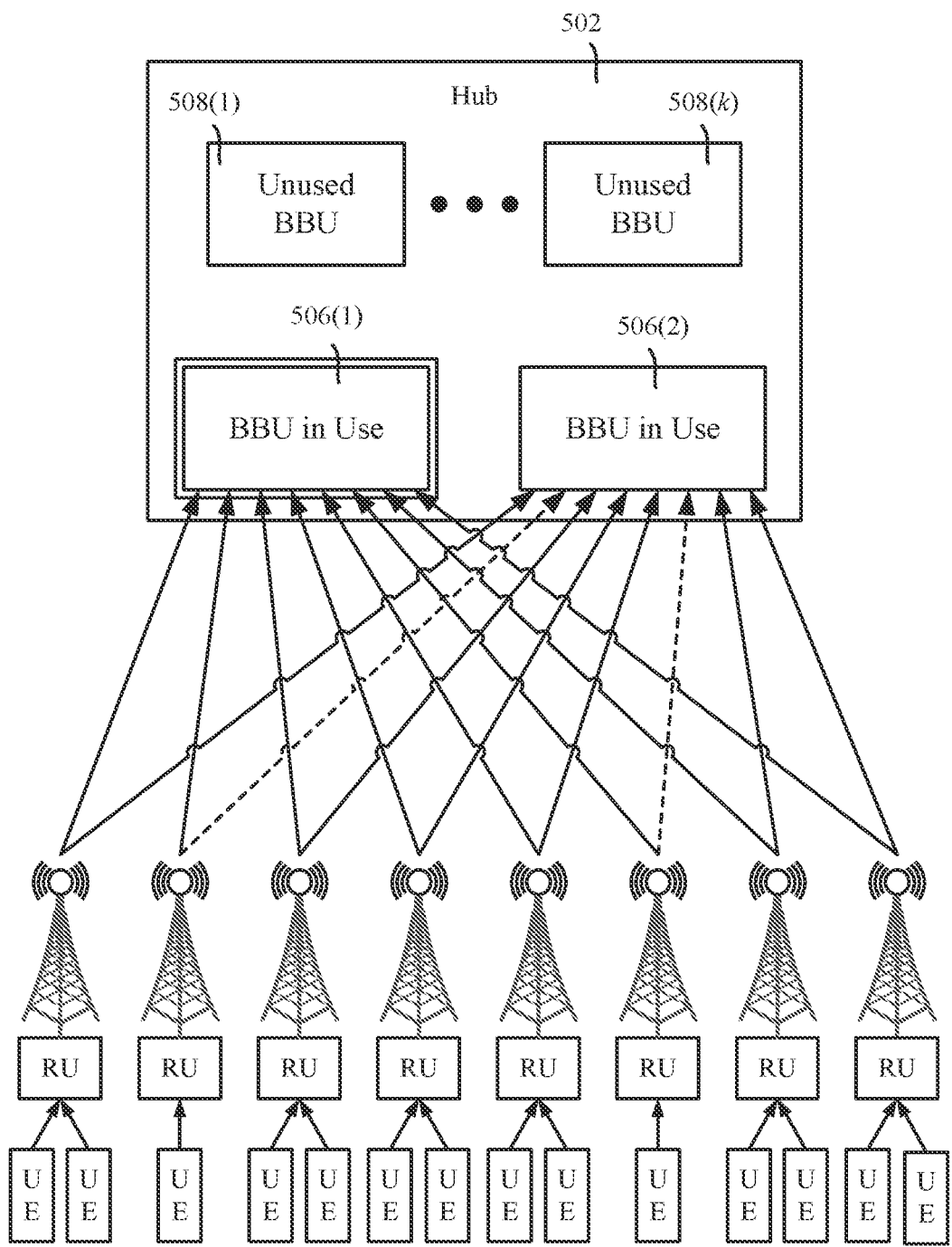
FIG. 5 is a block diagram representing mapping of user equipment sessions to baseband units of a pool, in accordance with various aspects and embodiments of the subject disclosure.

FIG. 5 shows another alternative implementation (which can be considered a "class2" approach) in which user equipment (UE) sessions determine how a radio unit (RU) coupled to the user equipment device for that UE session is mapped to one of the baseband units. The mapping is based on the estimated peak resource usage data (usage and duration) of each UE session, which can be determined in any number of known ways, including based on relevant historical data. Note that FIG. 5 shows an m-to-n mapping, in that any radio unit can be mapped to any baseband unit in use, and moreover, the same radio unit can be mapped to multiple different baseband units at the same time.

In the example of FIG. 5, two baseband units 506(1) and 506(2) are depicted in a hub 502 as being in use, and some number 508(1)-506(k) as in the pool/hub, but not in use. The "double block" representation of the baseband unit in use 506(1) is used to illustrate that the baseband unit 506(1) is more heavily used in terms of capacity than the other baseband unit in use 506(2). Again, in FIG. 5 the radio units and user equipment (UEs) are not individually labeled for purposes of maintaining clarity in the drawing.

Figure 6:
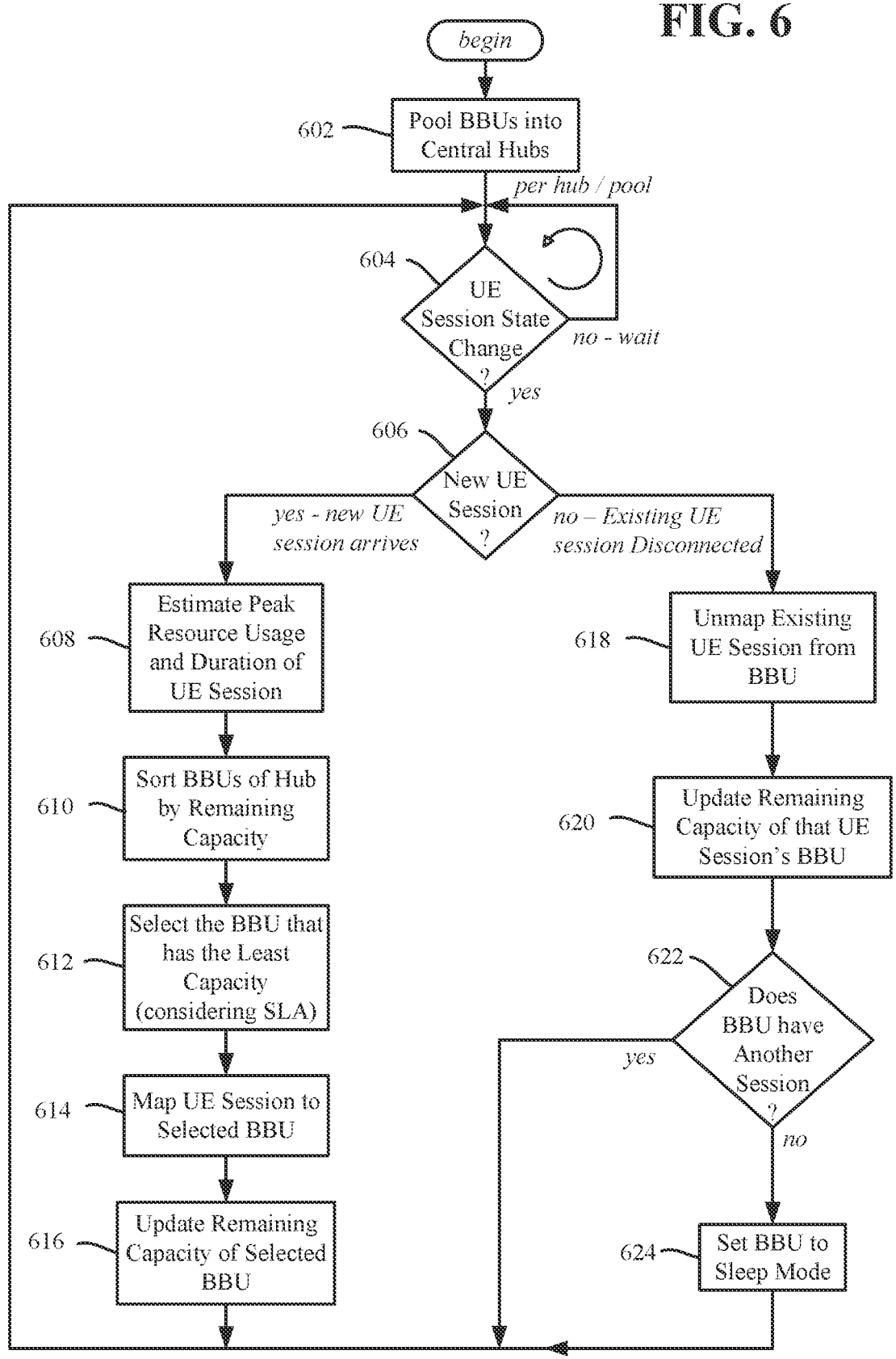
FIG. 6 is a flow diagram illustrating example operations related to mapping or unmapping a user equipment session to or from a baseband unit, in accordance with various aspects and embodiments of the subject disclosure.

The selective mapping (linking) of a baseband unit to a user session (a user equipment device coupled via a radio unit) is described in the example operations of FIG. 6. FIG. 6 also represents example unmapping operations. Operation 602 represents the initial pooling of the baseband units into hubs, with the subsequent operations being per-pool, that is, once the baseband units are pooled into hubs, each hub/pool can perform operations 604 and beyond on its own.

Operation 604 represents waiting for and detecting a UE session state change. Operation 606 differentiates between whether the state change is a new UE session or disconnection of an existing UE session. As can be readily appreciated, these are only example operations, and, for example, there can be separate logic/operations that more directly handle new UE sessions and disconnection of UE sessions.

For a newly arrived UE session, operation 608 estimates the peak resource usage and duration of the UE session, which correlates to an amount of capacity needed. Via operations 610 (sort) and 612 (selection), the UE session is mapped at operation 614 to the selected baseband unit with the least remaining capacity, (selection also considers that the service level agreement (SLA) would not be violated). More specifically, while it is the UE session that is mapped to the selected baseband unit, the mapping couples the UE session to the baseband unit by linking the radio unit, to which the user equipment device that is associated with the UE session is using, to the selected baseband unit.

The remaining capacity of the selected baseband unit is updated (that is decreased) at operation 616 to reflect the UE session mapping, given the estimated peak resource usage and duration. The process returns to operation 604 for the next UE session state change.

For a UE session disconnect, operation 606 branches to operation 618 to unmap the existing (now disconnecting) UE session from its mapped-to baseband unit. Operation 620 updates (increases) the remaining capacity of the baseband unit as a result of no longer being mapped to that particular UE session.

Operation 622 evaluates whether the baseband unit has another user session mapped to it. If not, the example process returns to operation 604 for the next UE session state change. If so, operation 624 sets that baseband unit to sleep (or other similar resource conservation) mode, and then the process returns to operation 604 for the next UE session state change.

Figure 7:
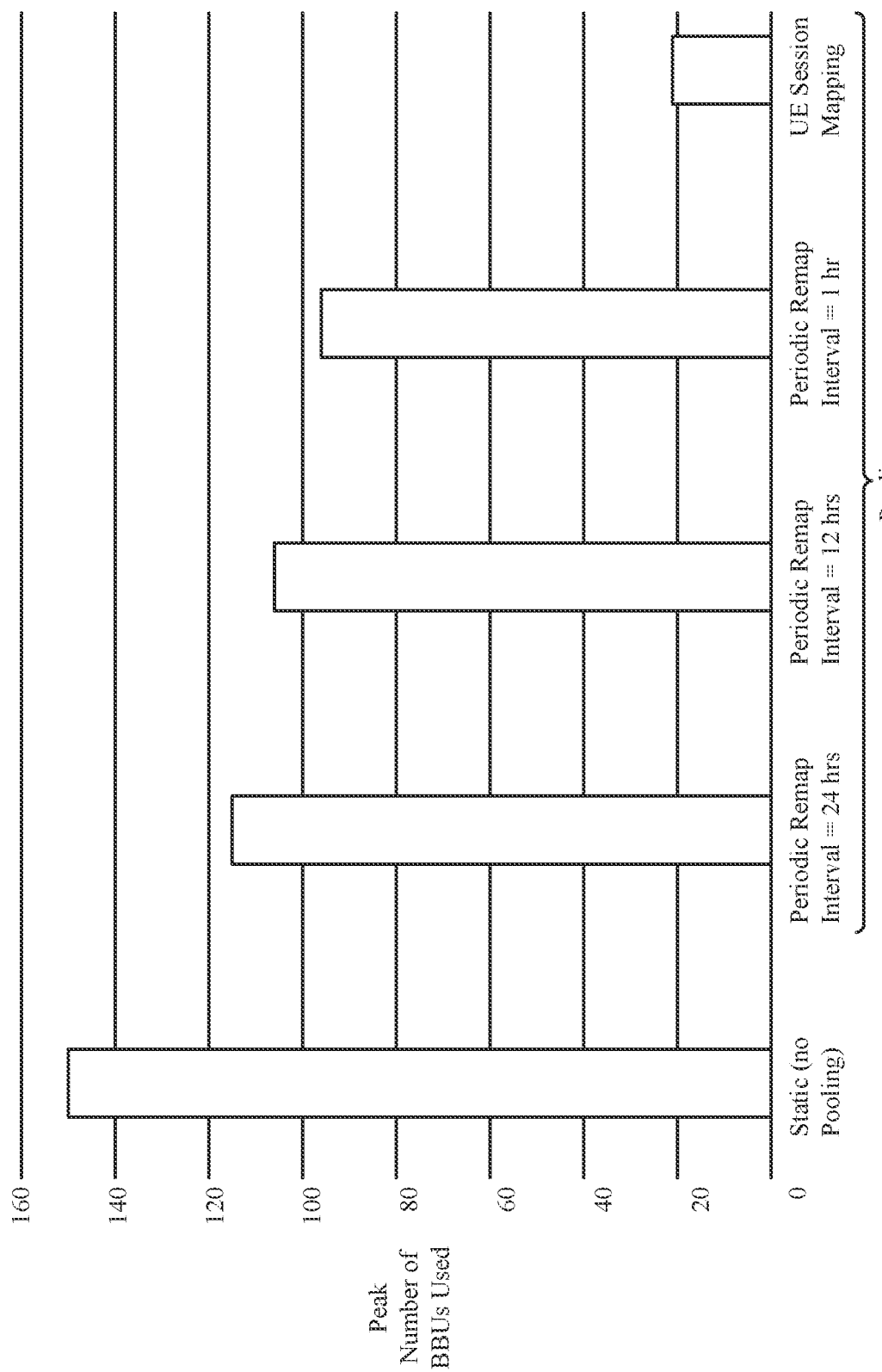
FIG. 7 is an example bar graph representation of baseband unit usage in various differing approaches, including baseband unit pooling approaches, in accordance with various aspects and embodiments of the subject disclosure
Figure 8:
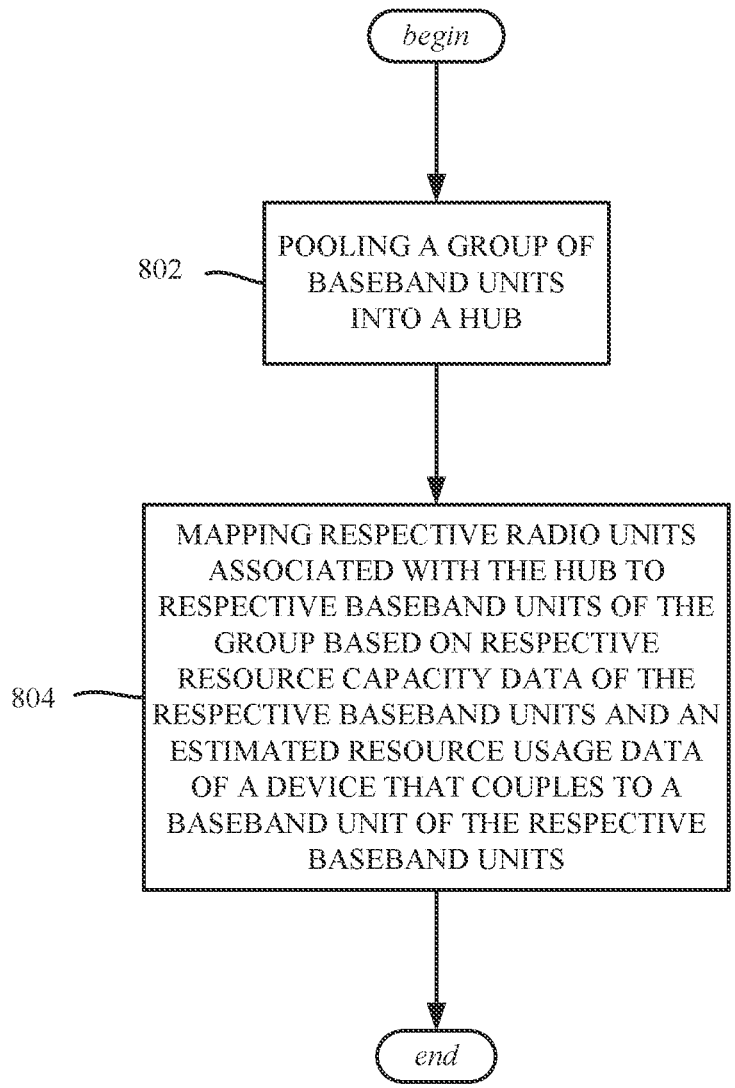
FIG. 8 illustrates example operations related to mapping a baseband unit of a group of pooled baseband units to a device that couples to the baseband unit, in accordance with various aspects and embodiments of the subject disclosure.

FIG. 7 graphically represents an example of various approaches to static assignment versus pooling, and how each corresponds to baseband unit usage. For example, the bar graph indicates the peak number of baseband units used with static baseband unit assignment to base stations (no pooling) is significantly higher than any of the pooling approaches. The more frequent the interval-based (periodic) remapping occurs, the less baseband units used. The dynamic per-UE session mapping is the lowest, on the order of seven times less baseband units needed to One or more example aspects are represented in FIG. 8, and can correspond to a system, comprising a processor, and a memory that stores executable instructions that, when executed by the processor of the system, facilitate performance of operations. Example operation 802 represents pooling a group of baseband units into a hub. Example operation 804 represents mapping respective radio units associated with the hub to respective baseband units of the group based on respective resource capacity data of the respective baseband units and an estimated resource usage data of a device that couples to a baseband unit of the respective baseband units.

Mapping the respective radio units of the group to the respective baseband units can be further based on ensuring that the mapping does not violate service level agreement constraint data. The service level agreement constraint data can include at least one of latency constraint data, jitter constraint data, bandwidth constraint data, packet loss constraint data, availability constraint data, or throughput constraint data.

The device that couples to the baseband unit of the respective baseband units can include a radio unit of the respective radio units, and the estimated resource usage data can include estimated respective peak resource usage data of the radio unit over an operation interval.

Mapping the respective radio units of the group to the respective baseband units can include selecting, for a radio unit of the respective radio units, a selected baseband unit including a baseband unit with a least remaining resource capacity among the respective baseband units.

The estimated resource usage data can include estimated peak resource usage of the respective radio units over an operation interval, and mapping the respective radio units of the group to the respective baseband units can include selecting, for a radio unit of the respective radio units, a selected baseband unit comprising a baseband unit with a least remaining resource capacity among the respective baseband units that does not violate service level agreement constraint data.

Further operations can include determining, following the mapping, an unused baseband unit, and causing the unused baseband unit to enter into a sleep mode of operation.

The device that couples to the baseband unit of the respective baseband units can include a user equipment device coupled via a radio unit of the respective radio units, and the estimated resource usage data can include, for the user equipment device, estimated peak resource usage of a user equipment session and duration of the user equipment session. Mapping the respective radio units of the group to the respective baseband units can include selecting, for a radio unit of the respective radio units to which the user equipment session is coupled, a selected baseband unit comprising a baseband unit with a least remaining capacity among the respective baseband units.

The estimated resource usage data can include estimated peak resource usage of a user equipment session and duration of the user equipment session, and wherein mapping the respective radio units of the group to the respective baseband units comprises selecting, for the user equipment session, a baseband unit with a least remaining capacity among the respective baseband units that does not violate service level agreement constraint data.

Further operations can include determining, following disconnection of a user equipment session, whether a baseband unit has no connected user equipment session, and, in response to determining that a baseband unit has no connected user equipment session, causing the baseband unit that has no connected user equipment session to enter into a sleep mode of operation.

Figure 9:
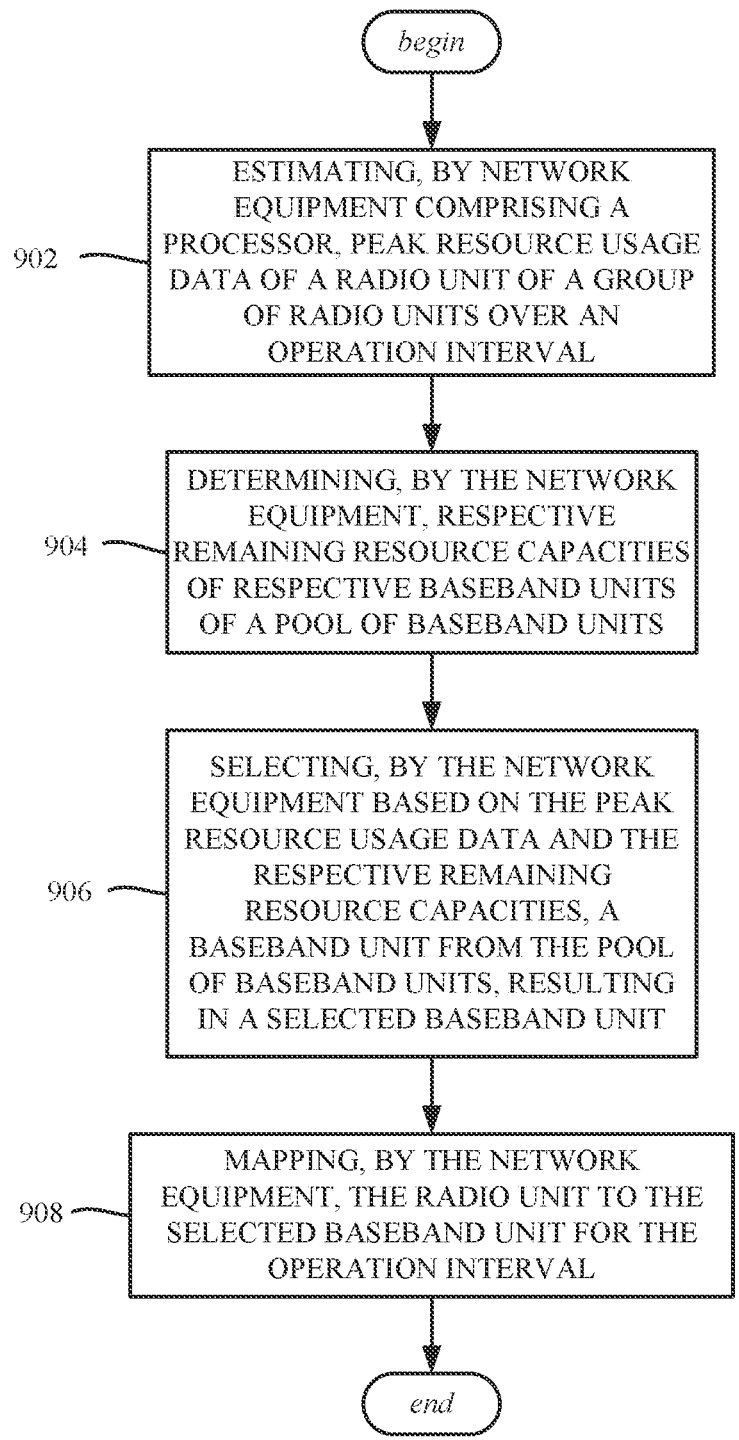
FIG. 9 illustrates example operations related to mapping a baseband unit of a pool of baseband units to a radio unit, in accordance with various aspects and embodiments of the subject disclosure.

One or more example aspects are represented in FIG. 9, and can correspond to example operations of a method. Operation 902 represents estimating, by network equipment comprising a processor, peak resource usage data of a radio unit of a group of radio units over an operation interval. Operation 904 represents determining, by the network equipment, respective remaining resource capacities of respective baseband units of a pool of baseband units. Operation 906 represents selecting, by the network equipment based on the peak resource usage data and the respective remaining resource capacities, a baseband unit from the pool of baseband units, resulting in a selected baseband unit. Operation 908 represents mapping, by the network equipment, the radio unit to the selected baseband unit for the operation interval.

Selecting the baseband unit can include selecting the baseband unit of the pool with a least remaining resource capacity among the respective baseband units that is consistent with service level agreement constraint data.

Further operations can include determining, by the network equipment following the mapping, an unused baseband unit, and instructing the unused baseband unit to enter into a sleep mode of operation.

Further operations can include grouping the pool of baseband units into a hub based on respective location data of base stations comprising the pool of baseband units.

Figure 10:
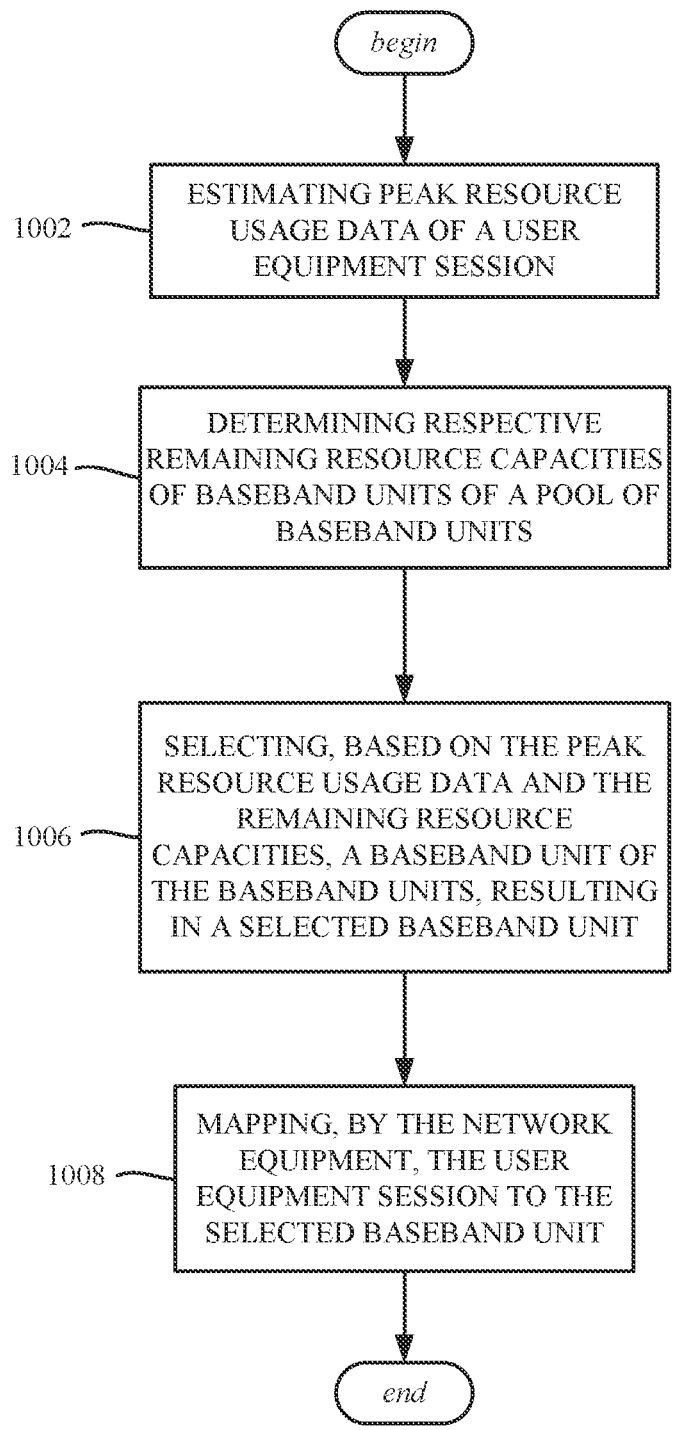
FIG. 10 illustrates example operations related to mapping a baseband unit of a pool of baseband units to a user session, in accordance with various aspects and embodiments of the subject disclosure.

One or more aspects are represented in FIG. 10, such as implemented in a machine-readable medium, comprising executable instructions that, when executed by a processor, facilitate performance of operations. Example operation 1002 represents estimating peak resource usage data of a user equipment session. Example operation 1004 represents determining respective remaining resource capacities of baseband units of a pool of baseband units. Example operation 1006 represents selecting, based on the peak resource usage data and the remaining resource capacities, a baseband unit of the baseband units, resulting in a selected baseband unit. Example operation 1008 represents mapping, by the network equipment, the user equipment session to the selected baseband unit.

Further operations can include determining, following disconnection of the user equipment session, whether the selected baseband unit has no other connected user equipment session, and, in response to determining that the selected baseband unit has no other connected user equipment session, facilitating entering the selected baseband unit into a sleep mode of operation.

Selecting the baseband unit can include selecting the baseband unit of the pool with a least remaining resource capacity among the respective baseband units that is not inconsistent with service level agreement constraint data.

The user equipment session can be a first the user equipment session, the selected baseband unit can be a first baseband unit, and further operations can include determining, following disconnection of a second user equipment session, whether a second baseband unit has no other connected user equipment session, and, in response to determining that the second baseband unit has no other connected user equipment session, facilitating entering the second baseband unit into a sleep mode of operation.

Further operations can include grouping the pool of baseband units into a hub based on respective location data of base stations comprising the pool of baseband units.

As can be seen, the technology described herein facilitates cost reduction of both capital and operational expenses, including by reducing the number of baseband units needed, (while meeting UE session service level agreement constraints (e.g., throughput)) by consolidating the resource usages of radio units or UE sessions into a smaller number of baseband units in a central pool. In general, because of pooling and selective mapping, less baseband units are needed overall. Further, by changing the states of unused baseband units to sleep mode or other power conservation mode (e.g., if not needed or not actively used in a certain time period), the cost caused by power consumption is reduced compared to the current approach Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
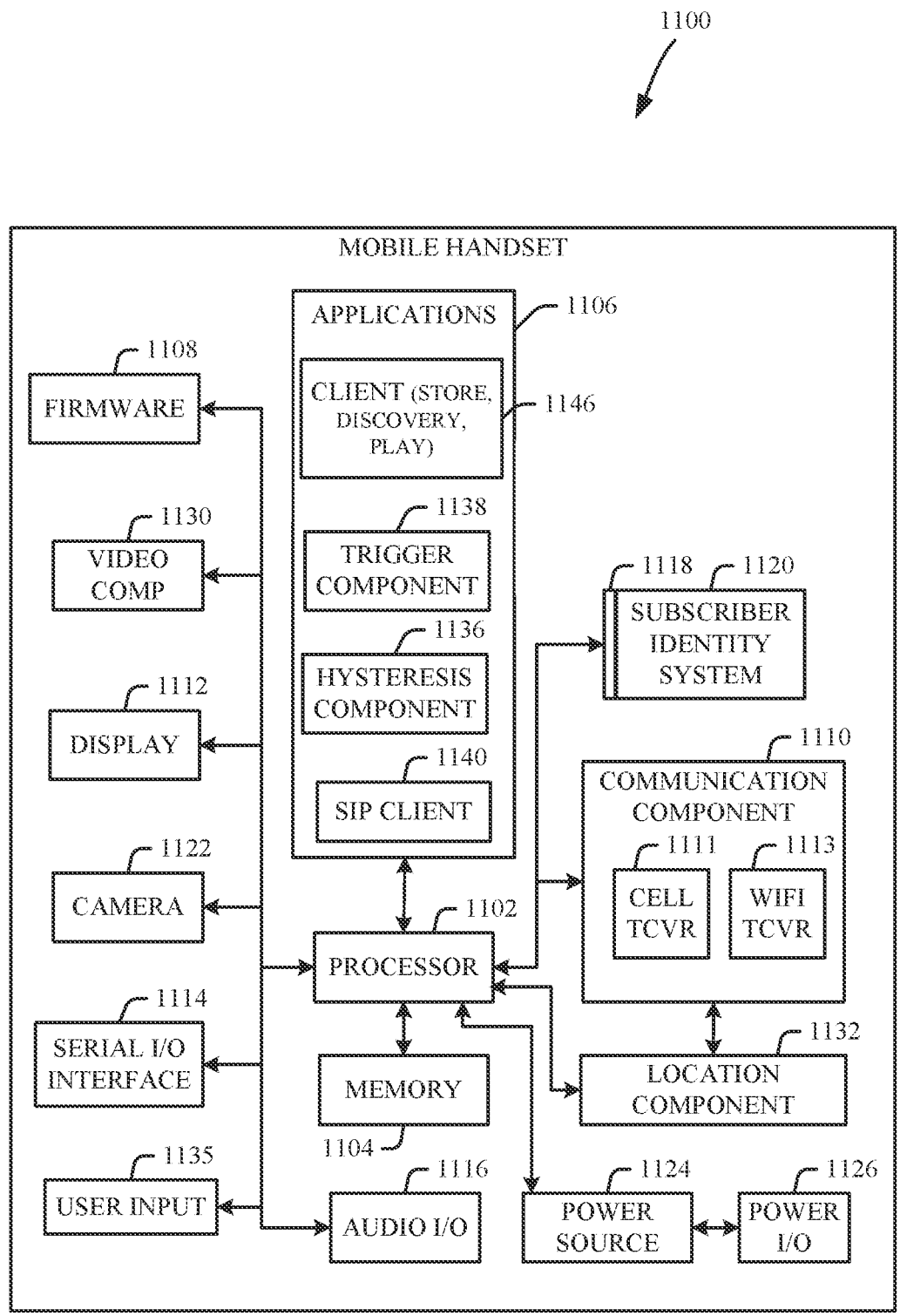
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device (such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
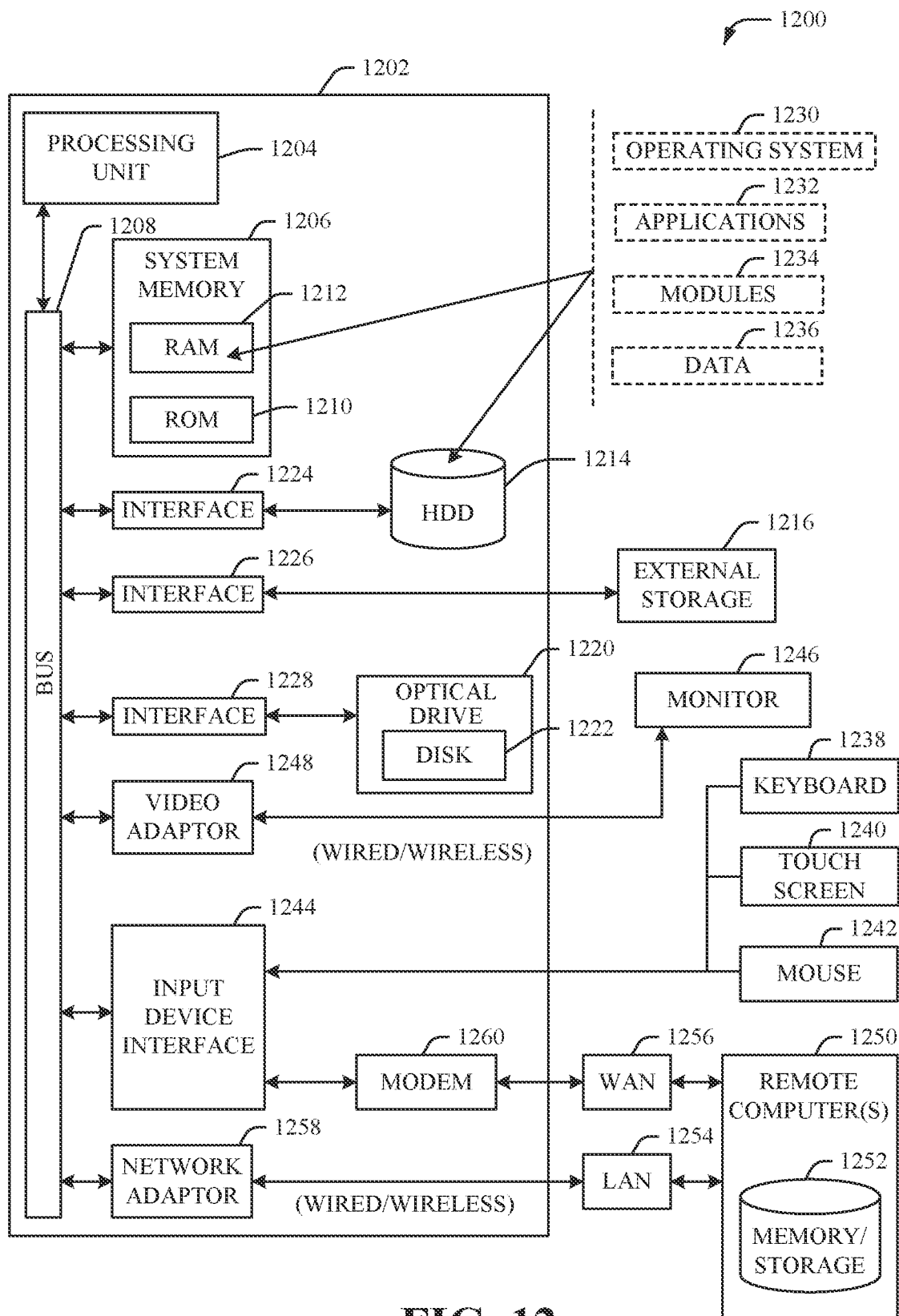
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
      pooling a group of baseband units into a hub; and
      mapping respective radio units associated with the hub to respective baseband units of the group based on respective resource capacity data of the respective baseband units and an estimated resource usage data of a device that couples to a baseband unit of the respective baseband units.

2. The system of claim 1, wherein the mapping the respective radio units associated with the hub to the respective baseband units is further based on ensuring that the mapping does not violate service level agreement constraint data.

3. The system of claim 2, wherein the service level agreement constraint data comprises at least one of: latency constraint data, jitter constraint data, bandwidth constraint data, packet loss constraint data, availability constraint data, or throughput constraint data.

4. The system of claim 1, wherein the device that couples to the baseband unit of the respective baseband units comprises a radio unit of the respective radio units, and wherein the estimated resource usage data comprises estimated respective peak resource usage data of the radio unit over an operation interval.

5. The system of claim 1, wherein the mapping the respective radio units associated with the hub to the respective baseband units comprises selecting, for a radio unit of the respective radio units, a selected baseband unit comprising a baseband unit with a least remaining resource capacity among the respective baseband units.

6. The system of claim 1, wherein the estimated resource usage data comprises estimated peak resource usage of the respective radio units over an operation interval, and wherein the mapping the respective radio units associated with the hub to the respective baseband units comprises selecting, for a radio unit of the respective radio units, a selected baseband unit comprising a baseband unit with a least remaining resource capacity among the respective baseband units that does not violate service level agreement constraint data.

7. The system of claim 6, wherein the operations further comprise determining, following the mapping, an unused baseband unit, and causing the unused baseband unit to enter into a sleep mode of operation.

8. The system of claim 1, wherein the device that couples to the baseband unit of the respective baseband units comprises a user equipment device coupled via a radio unit of the respective radio units, and wherein the estimated resource usage data comprises, for the user equipment device, estimated peak resource usage of a user equipment session and duration of the user equipment session.

9. The system of claim 8, wherein the mapping the respective radio units associated with the hub to the respective baseband units comprises selecting, for a radio unit of the respective radio units to which the user equipment session is coupled, a selected baseband unit comprising a baseband unit with a least remaining capacity among the respective baseband units.

10. The system of claim 1, wherein the estimated resource usage data comprises estimated peak resource usage of a user equipment session and duration of the user equipment session, and wherein the mapping the respective radio units associated with the hub to the respective baseband units comprises selecting, for a user equipment session, a baseband unit with a least remaining capacity among the respective baseband units that does not violate service level agreement constraint data.

11. The system of claim 1, wherein the operations further comprise determining, following a disconnection of a user equipment session, whether a baseband unit has no connected user equipment session, and, in response to determining that a baseband unit has no connected user equipment session, causing the baseband unit that has no connected user equipment session to enter into a sleep mode of operation.

12. A method, comprising:
estimating, by network equipment comprising a processor, peak resource usage data of a radio unit of a group of radio units over an operation interval;
determining, by the network equipment, respective remaining resource capacities of respective baseband units of a pool of baseband units;
selecting, by the network equipment based on the peak resource usage data and the respective remaining resource capacities, a baseband unit from the pool of baseband units, resulting in a selected baseband unit; and
mapping, by the network equipment, the radio unit to the selected baseband unit for the operation interval.

13. The method of claim 12, wherein the selecting the baseband unit comprises selecting the baseband unit of the pool with a least remaining resource capacity among the respective baseband units that is consistent with service level agreement constraint data.

14. The method of claim 12, further comprising determining, by the network equipment following the mapping, an unused baseband unit, and instructing the unused baseband unit to enter into a sleep mode of operation.

15. The method of claim 12, further comprising grouping, by the network equipment, the pool of baseband units into a hub based on respective location data of base stations comprising the pool of baseband units.

16. A non-transitory machine-readable medium, comprising executable instructions that, when executed by a processor, facilitate performance of operations, the operations comprising:
estimating peak resource usage data of a user equipment session;
determining respective remaining resource capacities of baseband units of a pool of baseband units;
selecting, based on the peak resource usage data and the remaining resource capacities, a baseband unit of the baseband units, resulting in a selected baseband unit; and
mapping the user equipment session to the selected baseband unit.

17. The non-transitory machine-readable medium of claim 16, wherein the operations further comprise determining, following a disconnection of the user equipment session, whether the selected baseband unit has no other connected user equipment session, and, in response to determining that the selected baseband unit has no other connected user equipment session, facilitating entering the selected baseband unit into a sleep mode of operation.

18. The non-transitory machine-readable medium of claim 16, wherein the selecting the baseband unit comprises selecting the baseband unit of the pool with a least remaining resource capacity among the respective baseband units that is not inconsistent with service level agreement constraint data.

19. The non-transitory machine-readable medium of claim 16, wherein the user equipment session is a first user equipment session, wherein the selected baseband unit is a first baseband unit, and wherein the operations further comprise determining, following a disconnection of a second user equipment session, whether a second baseband unit has no other connected user equipment session, and, in response to determining that the second baseband unit has no other connected user equipment session, facilitating entering the second baseband unit into a sleep mode of operation.

20. The non-transitory machine-readable medium of claim 16, wherein the operations further comprise grouping the pool of baseband units into a hub based on respective location data of base stations comprising the pool of baseband units.

* * * * *